(12) United States Patent
Zätterqvist (10) Patent No.: US 9,003,944 B2
(45) Date of Patent: Apr. 14, 2015

(54) PYROTECHNIC COUNTERMEASURE DISPENSING SYSTEM

(75) Inventor: Christer Zätterqvist, Uppsala (SE)

(73) Assignee: SAAB AB, Linköping (SE)

( * ) Notice: Subject to any disclaimer, the term of this patent is extended or adjusted under 35 U.S.C. 154(b) by 147 days.

(21) Appl. No.: 13/823,775

(22) PCT Filed: Nov. 19, 2010

(86) PCT No.: PCT/SE2010/051278
§ 371 (c)(1),
(2), (4) Date: Mar. 15, 2013

(87) PCT Pub. No.: WO2012/067558
PCT Pub. Date: May 24, 2012

(65) Prior Publication Data
US 2013/0167711 A1    Jul. 4, 2013

(51) Int. Cl.
*B64D 1/02* (2006.01)
*B64D 7/00* (2006.01)
*F42B 12/70* (2006.01)

(52) U.S. Cl.
CPC .. *B64D 1/02* (2013.01); *B64D 7/00* (2013.01); *F42B 12/70* (2013.01)

(58) Field of Classification Search
USPC ......... 102/335, 336, 364, 342, 345, 346, 351, 102/357, 360, 489; 89/1.51, 1.56
See application file for complete search history.

(56) References Cited

U.S. PATENT DOCUMENTS 3,598,015 A * 8/1971 Delistovich et al. ......... 89/1.814
(Continued)

FOREIGN PATENT DOCUMENTS

| EP | 0190800 A2 | 8/1986 |
| GB | 2138546 A | 10/1984 |

OTHER PUBLICATIONS

PCT/ISA/210—International Search Report—Jun. 30, 2011 (Issued in PCT/SE2010/051278).
(Continued)

*Primary Examiner* — Jonathan C Weber
(74) *Attorney, Agent, or Firm* — Venable LLP; Eric J. Franklin (57) ABSTRACT

The present invention regards a pyrotechnic countermeasure (15, 25) dispensing system (1) comprising a set of contacting members (27, 27') of a launching electronic circuitry (19). A first magazine (A) is mountable in said housing (23) in such way that a contacting body (41) of each pyrotechnic countermeasure (25) being in electrical communication with a dedicated contacting member (27) of the launching electronic circuitry (19), when the system (1) is ready to use. A central electronic unit (3) is associated with the launching electronic circuitry (19) for actuating of the pyrotechnic countermeasure (25) accommodated in the first magazine (A) in dependence upon a detected threat (29). A second magazine (B) designed for accommodation of at least one intelligent pyrotechnic countermeasure (15) is mountable in contact with the launching electronic circuitry (19) so that a contacting body (41) of said intelligent pyrotechnic countermeasure (15) will be set in electrical communication with a dedicated contacting member (27) of the launching electronic circuitry (19) via an adapter device (33, 33', 34).

11 Claims, 3 Drawing Sheets

(56) References Cited

U.S. PATENT DOCUMENTS

| | | | |
|---|---|---|---|
| 3,808,940 A | | 5/1974 | Schillreff et al. |
| 4,019,421 A | | 4/1977 | Strom |
| 4,063,485 A | * | 12/1977 | Carter et al. ............... 89/1.816 |
| 4,517,896 A | * | 5/1985 | Billard et al. ............... 102/342 |
| 4,679,483 A | | 7/1987 | Wrana |
| 5,259,289 A | * | 11/1993 | Peries et al. ............... 89/1.41 |
| 5,381,721 A | * | 1/1995 | Holmstrom et al. ........... 89/1.51 |
| 5,413,024 A | | 5/1995 | Plummer |
| 5,461,960 A | | 10/1995 | Marks et al. |
| 6,231,002 B1 | | 5/2001 | Hibma et al. |
| 2009/0193962 A1 | | 8/2009 | Zachrisson |

OTHER PUBLICATIONS

PCT/ISA/237—Written Opinion of the International Searching Authority—Jun. 30, 2011 (Issued in PCT/SE2010/051278).

PCT/IPEA/409—International Preliminary Report on Patentability—Feb. 20, 2013 (Issued in PCT/SE2010/051278).

PCT/IPEA/408—Wirtten Opinion of the International Preliminary Examining Authority—Jan. 30, 2013 (Issued in PCT/SE2010/051278).

PCT/IPEA/408—Written Opinion of the International Preliminary Examining Authority—Oct. 8, 2012 (Issued in PCT/SE2010/051278).

* cited by examiner

PYROTECHNIC COUNTERMEASURE DISPENSING SYSTEM

CROSS-REFERENCE TO RELATED APPLICATIONS

The application is the national phase under 35 U.S.C. §371 of PCT/SE2010/051278 filed 19 Nov. 2010.

TECHNICAL FIELD

The present invention relates to a pyrotechnic countermeasure dispensing system.

BACKGROUND ART

There are several pyrotechnic countermeasure systems that can be used in a vehicle, such as an aircraft or helicopter, for protecting the vehicle against different types of threats.

Existing pyrotechnic countermeasure dispenser systems for dispensing chaff cartridges or the like (radar reflective chaffs, flares etc.) include contacting members of said launching electronic circuitry. The contact members are designed for activation of e.g. pyrotechnic squibs, each of which may be arranged in respective chaff cartridge of the loaded magazine, so that the chaffs can be released from the dispenser individually. The central electronic unit, or power- and control system, of the vehicle, initiates such activation in case of a threat. The empty magazine is removed from the dispenser after landing and a new magazine with chaff cartridges will be mounted in the dispenser of the vehicle before take-off.

Also systems for protection of a vehicle against a possible threat are known, wherein the pyrotechnic countermeasure is launched towards the threat in a controllable manner. Such intelligent pyrotechnic countermeasure is guided and controlled by a separate power- and control system of the vehicle. The intelligent pyrotechnic countermeasure is defined as a countermeasure being thrusted and in-flight controllable with on-board capability to physically prevent an incoming threat from reaching its intended target. A dispenser and power- and control system for the launching and control of such intelligent pyrotechnic countermeasure involves high costs regarding the production and installation of the system in the vehicle.

U.S. Pat. No. 5,461,960 discloses a dispenser having a plurality of contacting members for electrical communication with respective chaff squib. The contacting members of the dispenser are coupled to contacting points of an interface plate, wherein the number of firing positions of chaffs in the magazine can be greater than the firing contacts of the breech plate. Selector means allows a first firing signal to pass only to one contact of a pair of contacts arranged in the interface plate and thereafter allow a second signal to pass to the other contact. In such way the dispenser can be fit with a magazine having a large number of chaffs for improving the performance of the dispenser.

U.S. Pat. No. 6,231,002 discloses a system for defending a vehicle against an incoming threat. An intelligent countermeasure is deployed from the vehicle by means of the system and the countermeasure is guided by the system to a desired orientation relative to the threat.

There is thus a need for providing a pyrotechnic countermeasure dispensing system that is cost effective to produce and implement to a vehicle, which system can be used for both dispensing chaff cartridges or the like (radar reflective chaffs, flares etc.) and intelligent pyrotechnic countermeasures.

Since high costs are involved in applying and maintaining a chaff/flare countermeasure dispensing system and at the same time a separate intelligent countermeasure dispensing system to a vehicle, there is a desire to make the system as cost-effective as possible for achieving a satisfactory defend of the vehicle, i.e. both the application of chaff/flare countermeasure and the application of intelligent pyrotechnic countermeasure for the total defend of the vehicle. Today these kinds of systems are working independently of each other.

SUMMARY OF THE INVENTION

This has been achieved by the system defined in the introduction and being characterized by the features of the characterizing part of claim 1.

Thereby is provided a mechanical integration of an intelligent countermeasure dispensing system to an existing pyrotechnic countermeasure dispenser systems for dispensing chaff cartridges or the like (radar reflective chaffs, flares etc.) in a simply and cost-effective manner.

In such way there is no need of building a separate dispenser and control system. An existing pyrotechnic countermeasure system for chaffs, flares etc. of a vehicle can be coupled to the launching electronic circuitry and the system can simply and cost-effective be added with certain program routines for the launching and controlling of intelligent pyrotechnic countermeasures.

Preferably, the adapter device comprises an electrically insulated plate including a first and a second side, the first side comprising a first contacting point for contact with the contacting body of the intelligent countermeasure, the second side comprising a second contacting point for contact with the dedicated contacting member of the launching electronic circuitry, the first contacting point being in electrically communication with the second contacting point.

In this way a robust adapter is provided which can be used in existing chaff or flare countermeasure launching systems. As the adapter is insulated there will be no spark formation between the not dedicated contacting members of the launching circuitry. The electrical communication between the first and second contacting points/surfaces is preferably made by means of an electrically conductive wire embedded in the insulated plate. The insulation material of the plate is preferably a synthetic.

Suitably, the number of first contacting points of the adapter device is less than the number of contacting members of the set of contacting members of the launching electronic circuitry.

The electrical signal for launching an intelligent pyrotechnic countermeasure will thus be led from the central electronic unit to a dedicated contacting member (firing contact), depending upon a detection of an incoming threat, and to the first contacting point of the insulating plate being in contact with the contacting body of the intelligent pyrotechnic countermeasure to be launched. The number of intelligent pyrotechnic countermeasures to be loaded in the magazine is one or more, but less than the number of contacting members of the launching electronic circuitry. However, the number of cells encompassing the intelligent countermeasures in the intelligent countermeasure magazine (the second magazine) is minor compared with the number of cells in a chaff/flare countermeasure magazine (the first magazine), still the both types of magazines are of the same outer dimension for fitting the housing of a common dispenser (the common dispenser is defined as a dispenser which can be loaded with either the first or the second magazine). The intelligent countermeasure magazine is thus adapted for receiving intelligent pyrotechnic countermeasures having a larger dimension than the traditional chaff and flare cartridges. By reducing the number of first contacting points, arranged and oriented in the insulating plate's first side such that they contact the contacting bodies of the intelligent pyrotechnic countermeasures, the larger (than the chaff/flare countermeasures) intelligent pyrotechnic countermeasures will have a safe and secure contacting with the dedicated contacting member of the launching electronic circuit at the same time as the dispenser can be used with both types of magazines, with only minor soft-ware adjustments and/or additional programme routines applied to the central electronic unit. No erroneous electrical contact between the not dedicated and surrounding contact members and the intelligent countermeasure will occur.

Alternatively, the adapter device is designed to be brought into insulated contact with contacting members surrounding the dedicated contacting member.

In such way there will not be any spark formation between the contacting members surrounding the dedicated contacting member of the launching electronic circuit, in case of moisture, dirt etc. in the dispenser.

Preferably, the central electronic unit is associated with a plurality of control functionalities for activation and guiding the intelligent countermeasure, which functionalities are selectable in dependence upon the characteristics of the detected threat.

Thereby an existing chaff/flare countermeasure dispenser of a vehicle cost-effectively can be provided for receiving a magazine encompassing intelligent pyrotechnic countermeasures, by just arranging an insulating plate or plates with few contact points for achieving a communication between the intelligent pyrotechnic countermeasures and the central electronic unit. This is achieved by connecting the central electronic unit, adapted for guidance and control of intelligent pyrotechnic countermeasures, to the launching electronic circuit of the vehicle's existing chaff/flare countermeasure dispenser. The central electronic unit can activate the intelligent pyrotechnic countermeasure via the dedicated contacting member and/or via a radio control associated with the central electronic unit. The radio control may include a transmitter in the vehicle (the aircraft, helicopter etc.) and a receiver in the intelligent pyrotechnic countermeasure. Different types of radar/detection means are arranged in the vehicle and being associated with the central electronic unit for detection of incoming threats threatening the vehicle.

Suitably, at least one control functionality is designed to be performed over a contacting member of the launching electronic circuitry, the contacting member being in contact with a contacting body of said intelligent countermeasure via the adapter device.

A firing signal addressed to a squib of the intelligent countermeasure may advantageously be sent via the contact points of the insulating plate from the central electronic unit in case of detected threat. Preferably, a further contacting body of the countermeasure is in contact via the insulating plate to a further dedicated contacting member of the launching electronic circuit, which further contacting body is in contact with the central electronic unit for transmitting specific threat characteristics to the intelligent countermeasure by wire.

There is thus achieved that the firing contacts (contacting members) for firing chaffs/flares also can be used for firing intelligent pyrotechnic countermeasures in response to a detected threat, or be used for sending commando signals to the intelligent pyrotechnic countermeasure related to the threat characteristics. Radar warning, laser warning, missile warning functions and other functionalities of the vehicle's total defend system are associated with the launching electronic circuit and the central electronic unit. Also radio control means, display means etc. are associated with the central electronic unit for guidance of the intelligent pyrotechnic countermeasure towards the threat. The intelligent pyrotechnic countermeasure can thus be launched from the common dispenser (can be loaded with either a magazine with pyrotechnic chaffs/flares etc or a magazine with intelligent pyrotechnic countermeasures) of the vehicle.

The dispenser's housing can be loaded with a magazine with chaffs or can be loaded with a magazine with intelligent pyrotechnic countermeasures, when the vehicle is on ground for service and reloading, depending upon the mission complexity. The staff personal can easy mount the preferred magazine (with pyrotechnic chaffs/flares etc. or intelligent pyrotechnic countermeasures) or several magazines (if the vehicle comprises several dispensers) in a well known position of the vehicle. The vehicle's defence system is already coupled to the common dispenser and is ready to use in accordance with the characteristics of the magazine being loaded.

Alternatively, at least one control functionality is designed to be performed over a dedicated radio control unit associated with the central electronic unit for wireless controlling of the intelligent countermeasure.

The radio control unit is associated with warning systems and detection systems of the central electronic unit for guidance of the intelligent pyrotechnic countermeasure towards the threat.

Preferably, each magazine of the system includes an identification code, which is read by the central electronic unit when the magazine is (or have been) mounted in the housing for identifying the type of magazine.

In such way the central electronic unit will register the type of magazine, i.e. if the payload is dedicated to pyrotechnic chaffs/flares etc. or intelligent pyrotechnic countermeasures, the number of loaded cells of the magazine and also the intelligent pyrotechnic countermeasure performance characteristics. This registration being adapted to the soft-ware of the system and in case of a detected threat, the countermeasure launching will proceed in the appropriate way.

Suitably, the adapter device basically is made of synthetic material and in one unit.

Thereby a material, which provides strength and is of low weight, and which at the same time is insulating, can be used for the adapter device. By simply locating the first contacting points at locations at the insulating plate corresponding with the positions of the contacting bodies of the intelligent pyrotechnic countermeasures (when loaded in the second magazine) and coupling those first contacting points with the second contacting points by means of wire means embedded in the synthetic material, a robust adapter device is achieved.

Preferably, the adapter device is mainly made of an incombustible material.

Alternatively, the adapter device also serves as a breech plate.

The robust adapter device can thus at the same time be used as a breech plate. Thus an integrated adapter and breech plate is achieved.

Suitably, the adapter device is designed to be fit onto the second magazine by means of a snap-lock device.

At the same time as a cost-effective pyrotechnic countermeasure dispensing system is provided, the handling of magazines on ground made by service personal will thus be simplified, since there is only one type of magazine outer dimension and the adapter device per se prevents the intelligent pyrotechnic countermeasure to fall out (the adapter device will serve as a support wall supporting the counter measure) during transport of the loaded second magazine to the vehicle.

Preferably, the first magazine is designed for accommodation of pyrotechnic countermeasures of the type radar reflective chaffs or flares etc., the first magazine is mountable in said housing without any adapter device.

The dispenser is thus capable for receiving an intelligent pyrotechnic countermeasure magazine (second magazine) or a pyrotechnic chaff (or similar non intelligent countermeasure) magazine (first magazine). In case of mounting of a chaff/flare magazine in the dispenser, the number of contacting members of the dispenser corresponds with the number of chaffs/flares in the magazine and no adapter device is necessary for such first magazine.

Suitable, the adapter device is designed as a grid block being built of crosswise arranged insulating synthetic ribs joined in such way that they rest on the contacting members of the dispenser. Contacting points are suitable provided at the ribs at positions corresponding with the placement of the contacting bodies of the intelligent pyrotechnic countermeasure. The contacting points are suitable designed as conductive bars extending through the block from a fists side facing the countermeasure to a second side of the block facing the contacting members.

This is also solved by providing a second magazine for accommodation of intelligent pyrotechnic countermeasures.

Thereby, intelligent pyrotechnic countermeasures can be launched from existing dispensers mounted in vehicles, which dispensers are designed for pyrotechnic countermeasures solely being deployable and not possible to guide towards the threat.

BRIEF DESCRIPTION OF THE DRAWINGS

The present invention will now be described by way of examples with references to the accompanying schematic drawings, of which:

FIGS. 9a-9b illustrate a further embodiment including an adapter device designed as a grid block.

DETAILED DESCRIPTION

Hereinafter, embodiments of the present invention will be described in detail with reference to the accompanying drawings, wherein for the sake of clarity and understanding of the invention some details of no importance are deleted from the drawings.

Figure 1:
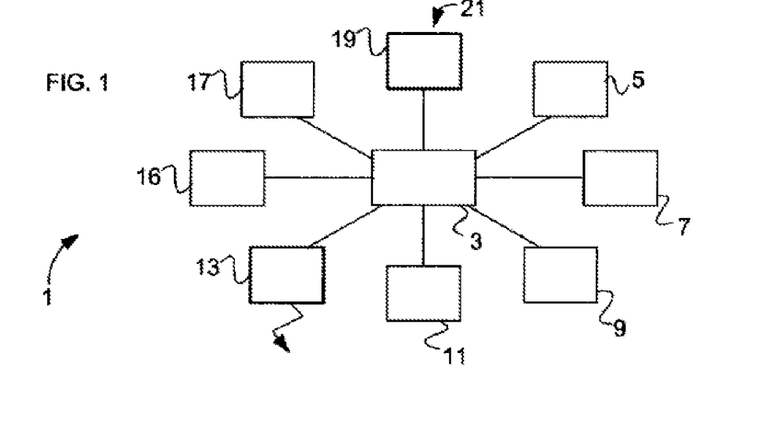
FIG. 1 illustrates a central electronic unit and associated functionalities of the countermeasure dispensing system.

FIG. 1 schematically illustrates a central electronic unit CEU 3 and associated functionalities of the countermeasure dispensing system 1, herein also called system. The system's 1 CEU 3 is associated (by means of wires) with a radar warning unit 5, a laser warning unit 7, a radar unit 9, a missile approaching warning unit 11, a transmitter unit 13 for guidance of an intelligent pyrotechnic countermeasure 15 (see FIG. 2) (designed to be guided and controlled towards a detected incoming threat 29, by means of the CEU 3 of the vehicle). The intelligent pyrotechnic countermeasure 15 is more precise defined as a countermeasure being thrusted and in-flight controllable with on-board capability to physically prevent an incoming threat from reaching its intended target. The CEU 3 is furthermore associated with a firing control 16 for deploying the pyrotechnic countermeasure, a display unit 17 in the vehicle's cockpit and with a launching electronic circuit 19 of a dispenser 21 designed for dispensing either pyrotechnic radar reflective chaffs/flares (not shown) or intelligent pyrotechnic countermeasures 15, dependent upon the magazine payload type (magazine A or B) (i.e. first magazine or second magazine) mounted in the dispenser's 21 housing 23 (see FIG. 3).

The system 1 is thus adapted for protecting the vehicle by launching different types of pyrotechnic countermeasures; not controllable pyrotechnic countermeasures (such as radar reflective chaffs, flares etc.—called not intelligent pyrotechnic countermeasures) and intelligent countermeasures. One type of not guided pyrotechnic countermeasures (for example chaffs) can be loaded in a coded first magazine having an outer design and exterior measure corresponding with the outer design and exterior measure of a second magazine accommodating the type of intelligent pyrotechnic countermeasures. The both types of magazines A, B respectively fit the housing 23 of the dispenser 21 (see FIG. 3). A suitable type of magazine (A or B) is mounted in the dispenser 21 when the vehicle (such as an aircraft 31 or helicopter) has landed, depending upon the complexity of the next mission.

Each magazine A, B of the system 1 includes an identification code ID, which is read by the CEU 3 when the actual magazine (A or B) is mounted in the housing 23 for identifying the type of magazine. In such way the CEU 3 will register the type of magazine (i.e. if the payload is pyrotechnic chaffs/flares or intelligent pyrotechnic countermeasures) the number of loaded cells of the magazine and the intelligent pyrotechnic countermeasure performance characteristics. This registration is performed by soft-ware of the CEU 3 and in case of a detected threat 29, the pyrotechnic countermeasure thereby can be launched in a selective manner. If the identification code ID indicates that the magazine A is loaded with flares 25 (see FIG. 3), the CEU 3 will launch the flares 25 in sequence by giving a signal to the launching electronic circuitry 19 actuating a squib 36 of the respective flare 25 via the contacting members 27 (see FIG. 3) of the dispenser 21. If the identification code ID indicates that the magazine B is loaded with intelligent pyrotechnic countermeasures 15, the CEU 3 will launch and guide the intelligent pyrotechnic countermeasure 15 towards a threat 29 (see FIG. 2). In this case also, the contacting members 27 of the launching electronic circuit 19 of the dispenser 21 are used for actuating the launching of this type of pyrotechnic countermeasure.

Figure 2:
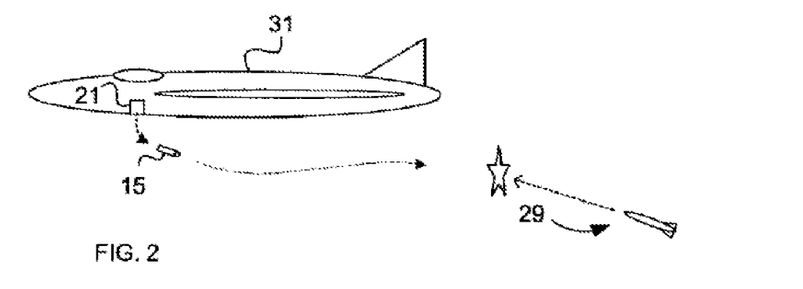
FIG. 2 illustrates an aircraft launching an intelligent pyrotechnic countermeasure towards an incoming threat.

FIG. 2 illustrates the aircraft 31 just as it has launched the intelligent pyrotechnic countermeasure 15, now heading towards the incoming threat 29 The radar unit 9 or missile approaching warning unit 11 of the system 1 has detected the threat 29 and the CEU 3 sends a signal to the launching electronic circuitry 19 to launch the intelligent pyrotechnic countermeasure 15 and guides and control the latter towards the threat 29 for destruction by means of a radio control unit or transmitter unit 13. The contacting member 27 of the launching electronic circuitry 19 otherwise used for squib activation of chaffs and flares, is hereby also used for transmitting data to the intelligent pyrotechnic countermeasure 15, such as rough bearing data for initial orientation of the intelligent pyrotechnic countermeasure 15 towards the threat 29. That is, the intelligent pyrotechnic countermeasure 15 will receive a control signal feature from the CEU 3 via the dedicated contacting members 27 in an early stage of the launching sequence, which will guarantee a reliable transmission and correct course for the intelligent pyrotechnic countermeasure 15 towards the threat 29 as early as possible.

The CEU 3 is associated with a plurality of control functionalities for activation and guiding the intelligent pyrotechnic countermeasure 15, which functionalities are selectable in dependence upon the characteristics of the detected threat 29. Thereby an existing chaff/flare countermeasure dispenser of the aircraft 31 cost-effectively can be provided for mounting the second magazine B encompassing intelligent pyrotechnic countermeasures 15, by just arranging an insulating adapter plate 33 (see FIG. 3) or adapter plates 33' (see FIG. 7) with few first contacting points 35 for achieving an electrical and/or signal communication between the intelligent pyrotechnic countermeasures 15 and the CEU 3. This is achieved by connecting the CEU 3 (adapted with soft-ware for guidance and control of intelligent pyrotechnic countermeasures 15) to the launching electronic circuit 19 of the aircraft's 31 existing chaff/flare countermeasure dispenser 21. The CEU 3 activates the intelligent pyrotechnic countermeasure 15 via the dedicated contacting member 27 and/or via a radio control (transmitter unit 13) associated with the CEU 3. The radio control includes the transmitter unit 13 arranged in the aircraft 31 and a receiver (not shown) arranged in the intelligent pyrotechnic countermeasure 15. Different types of radar/detection means are arranged in the aircraft 31 and being associated with the CEU 3 for detection of incoming threats 29.

Figure 3:
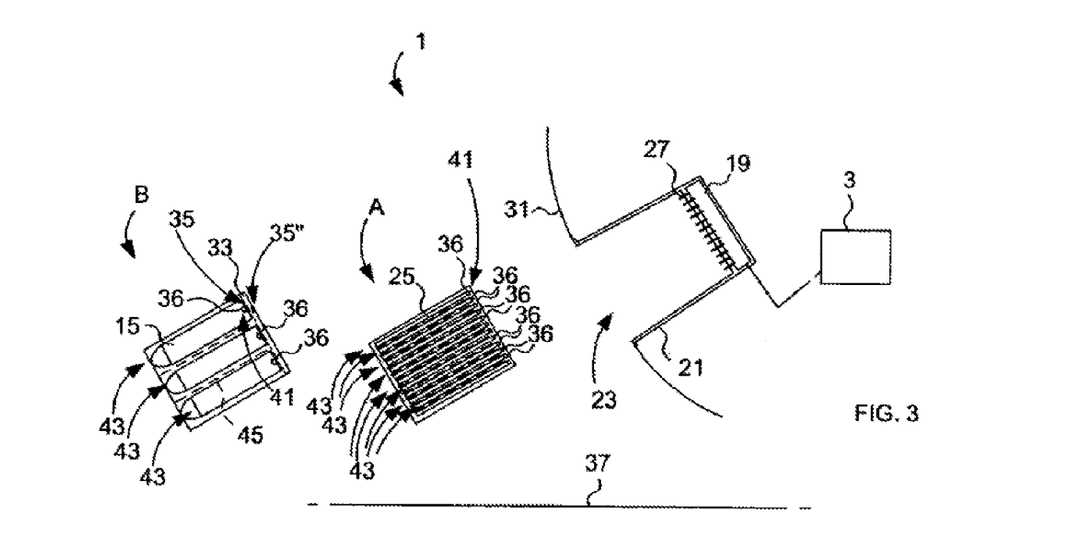
FIG. 3 illustrates a dispenser and a first magazine comprising chaffs and a second magazine comprising intelligent pyrotechnic countermeasures, the two magazines are each designed to fit the dispenser.

FIG. 3 illustrates the dispenser 21 and a first magazine A comprising chaffs or flares 25 and a second magazine B comprising intelligent pyrotechnic countermeasures 15, the two magazines A, B are designed to fit the dispenser's 21 housing 23 by the fact that both the magazines A, B have the same outer measure and exterior design. A squib 36 (contacting body 41) of respective pyrotechnic chaff/flare 25 and intelligent pyrotechnic countermeasure 15 will come into contact with the contacting member 27 (firing contacts) of the dispenser 21 when the first magazine A or second magazine B is mounted in the housing 23. In FIG. 3 the first magazine A accommodating flares 25 is to be mounted in the housing 23. The aircraft 31 is standing still on ground 37. The contacting members 27 will come into contact with the squibs 36 (of either the flares 25 or intelligent pyrotechnic countermeasures 15) the when the magazine A or B is properly fit in the housing 23 and the system 1 is ready to use. The number of cells 43 of the second magazine B is less than the number of cells 43 of the first magazine A. Each cell 43 encompasses a pyrotechnic countermeasure 15, 25.

Figure 4A:
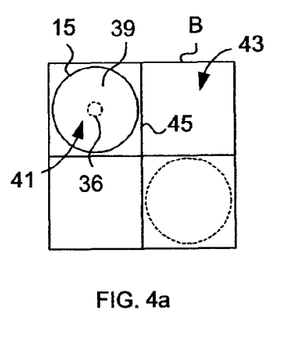
FIG. 4a illustrates the underside of an intelligent pyrotechnic countermeasure accommodated in a second magazine.
Figure 4B:
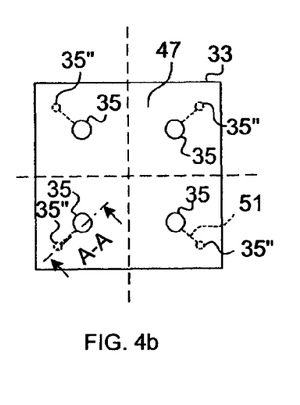
FIG. 4b illustrates an adapter plate to be mounted in contact with the undersides of the intelligent countermeasures.
Figure 4C:
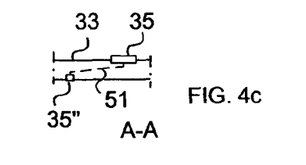
FIG. 4c illustrates a cross-section A-A taken in FIG. 4b showing a first and second contacting point of the adapter plate.

FIG. 4a illustrates an underside 39 of an intelligent pyrotechnic countermeasure 15 accommodated in a cell 43 of a second magazine B. The underside 39 comprises a contacting body 41 for receiving a firing signal or other information necessary for the intelligent pyrotechnic countermeasure 15 to reach the threat 29. The second magazine B is divided into four cells 43. Wall portions 45 separate the cells 43 from each other. Each cell 43 is thus provided for encompassing an intelligent pyrotechnic countermeasure 15. FIG. 4b illustrates an adapter plate 33 to be mounted with a first side 47 of the adapter plate 33 towards the undersides 39 of the intelligent pyrotechnic countermeasures 15. The first side 47 of the adapter plate 33 is shown in FIG. 4b, which first side 47 thus faces the undersides 39. A first contacting point 35 or contacting surface is arranged at the first side 47 so that the position of the intelligent pyrotechnic countermeasure 15 corresponds with the position of the contacting body 41 of the intelligent pyrotechnic countermeasure 15, when the intelligent pyrotechnic countermeasure 15 being arranged in its dedicated cell 43 of the second magazine B and when the system 1 is ready to use. An imaginary line corresponding with the centre axis (not shown) of the intelligent pyrotechnic countermeasure 15 intersects the fist contacting point 35. The adapter plate 33 comprises four first contacting points 35, i.e. the number of fist contacting points 35 corresponds in this embodiment with the number of intelligent pyrotechnic countermeasures 15 mounted in the second magazine B. Opposite the first side 47 of the adapter plate 33, there is a second side 49 of the adapter plate 33 comprising four second contacting points 35". The first 35 and second 35" contacting points serving one cell 43, and being arranged in the adapter plate 33 for each intelligent pyrotechnic countermeasure 15, are connected to each other for electrical communication. The adapter plate 33 is made of an insulating material. The contacting points 35, 35" and a respective wire 51 between each pair of first 35 and second 35" contacting points are made of copper. FIG. 4c illustrates a cross-section A-A taken in FIG. 4b showing the first 35 and second 35" contacting point of the adapter plate 33 and the joining wire 51 embedded in the insulated adapter plate 33.

Figure 4D:
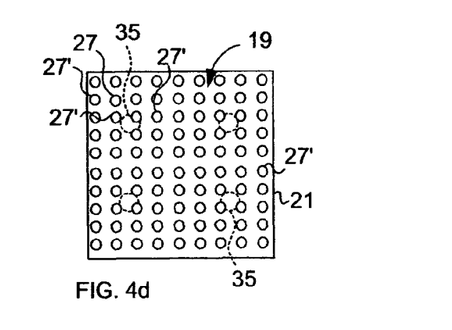
FIG. 4d illustrates contacting members of a dispenser also designed for dispensing radar reflective flares from a first magazine.

FIG. 4d illustrates a set of contacting members 27, 27' of a launching electronic circuitry 19 of a dispenser 21. The dispenser 21 is designed for dispensing radar reflective chaffs or pyrotechnic flares or the like as well (not only intelligent pyrotechnic countermeasures) from a first magazine A (not shown, see FIG. 3). By means of the insulated adapter plate 33 and via the first 35 and second 35" contacting points, the contacting bodies 41 of the intelligent pyrotechnic countermeasure 15 will be in contact with dedicated contacting members 27 only. The insulated adapter plate 33 is also designed to be brought into insulated contact with contacting members 27' surrounding the dedicated contacting member 27. In such way there will not be any spark formation or short circuit between the contacting members 27' surrounding the dedicated contacting member 27 of the launching electronic circuit 19.

Figure 5:
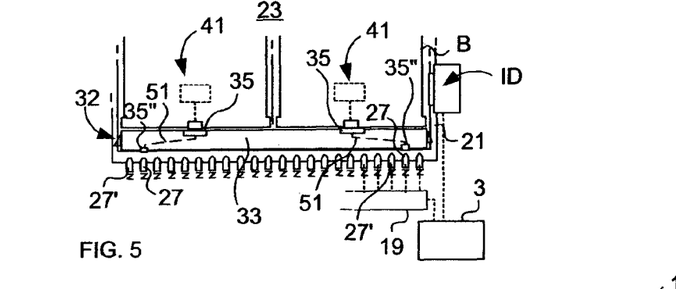
FIG. 5 illustrates a portion of the second magazine comprising the adapter plate, said magazine being mounted in a housing of the dispenser.

FIG. 5 illustrates the second magazine B comprising the adapter plate 33, said magazine B being mounted in a housing 23 of the dispenser 21. The number of first contacting points 35 of the insulated adapter plate 33 is less than the number of contacting members 27, 27' of the set of contacting members of the launching electronic circuitry 19. The electrical signal for launching an intelligent pyrotechnic countermeasure 15 will be sent from the CEU 3 to a dedicated contacting member 27 (firing contact), depending upon the detection of an incoming threat, and via the second contacting point 35", the wire 51, first contacting point 35 of the insulating adapter plate 33, to the contacting body 41 of the intelligent pyrotechnic countermeasure 15 to be launched. The first contacting point 35 is in contact with the contacting body 41. The number of cells 43 encompassing the intelligent pyrotechnic countermeasures 15 in the second magazine B is minor compared with the number of cells 43 in a first chaff/flare countermeasure magazine A (see FIG. 3); still the both types of magazines A, B are of the same outer dimension for fitting the housing 23 of a common dispenser 21. The second magazine B is thus adapted for receiving intelligent pyrotechnic countermeasures 15 having a larger dimension than traditional pyrotechnic chaff and flare cartridges. By reducing the number of first contacting points 35, arranged and oriented in the insulating adapter plate's 33 first side 47 such that they contact the contacting bodies 41 of the intelligent pyrotechnic countermeasures 15, the more bulky (than the chaff/flare countermeasures) intelligent pyrotechnic countermeasures 15 will have a safe and secure contacting with the dedicated contacting member 27 of the launching electronic circuit 19. No erroneous contact between the not dedicated and surrounding contact members 27' and the intelligent pyrotechnic countermeasure 15 will occur. A snap-lock 32 is provided for releasable locking the adapter plate 33 to the magazine B. At the same time as a cost-effective pyrotechnic countermeasure dispensing system is provided, the handling of magazines on ground made by service personal will thus be simplified, since there is only one type of magazine outer dimension and the adapter device per se prevents the intelligent pyrotechnic countermeasure to fall out (the adapter device will serve as a support wall supporting the counter measure) during transport of the loaded second magazine to the vehicle.

Figure 6:
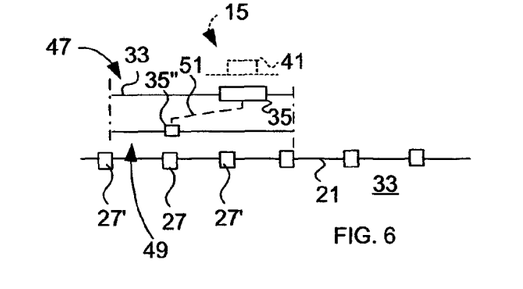
FIG. 6 illustrates some of the contacting members of the dispenser and a section of the adapter plate.

FIG. 6 illustrates some of the contacting members 27, 27' of the dispenser 21 and schematically a section of the adapter plate 33. The dedicated contacting member 27 will be brought into contact with the insulated adapter plate's 33 second contacting point 35" being in electrical communication with the first contacting point 35 of the adapter plate 33 for contacting the contacting body 41 of the intelligent pyrotechnic countermeasure 15. The adapter plate 33 in FIG. 6 is basically made of synthetic material in one unit and the contacting points 35, 35" and joining wires 51 are made of a conductive material embedded in the synthetic material. The synthetic material is made as an incombustible material wherein the adapter plate 33 also serves as a breech plate.

Figure 7:
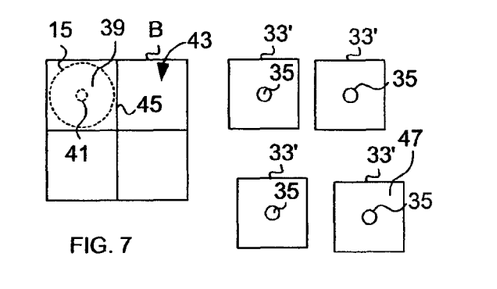
FIG. 7 illustrates a second magazine comprising four adapter plates, each of which is arranged for coming in contact with respective intelligent countermeasure's contacting body.

FIG. 7 illustrates a second magazine B comprising four adapter plates 33', each of which is arranged for coming in contact with respective intelligent pyrotechnic countermeasure's 15 contacting body 41. Each adapter plate 33' is releasable locked at the bottom end of the second magazine B.

Figure 8A:
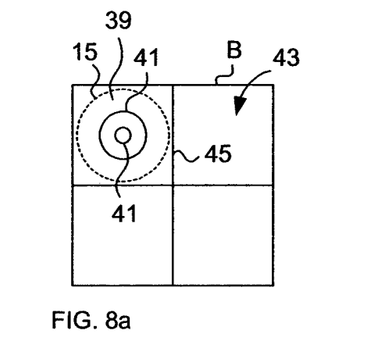
FIG. 8a illustrates the underside of an intelligent pyrotechnic countermeasure accommodated in a second magazine, wherein the intelligent pyrotechnic countermeasure comprises two contacting bodies for electrical contact with the launching electronic circuitry.
Figure 8B:
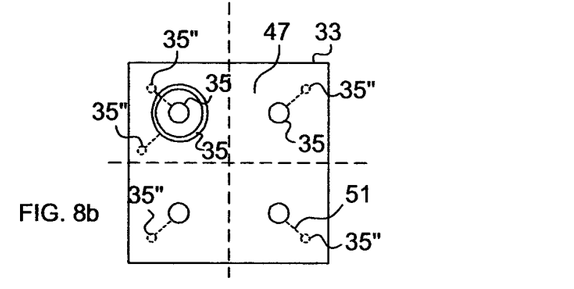
FIG. 8b illustrates an adapter plate to be mounted in contact with the respective underside of intelligent pyrotechnic countermeasures, wherein the adapter plate for each intelligent countermeasure comprises two contacting points at the first side of the adapter plate.
Figure 8C:
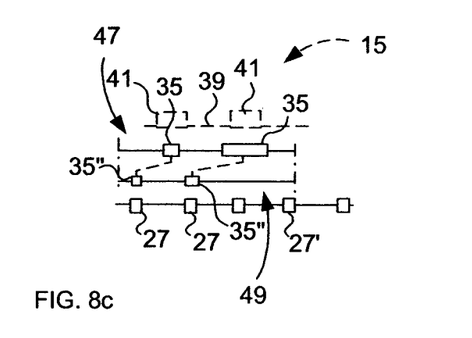
FIG. 8c illustrates a cross-section of a portion of the adapter plate in FIG. 8b showing the contacting points coming into contact with the contacting members of the launching electronic circuitry.

FIG. 8a illustrates the underside 39 of an intelligent pyrotechnic countermeasure 15 accommodated in a cell 43 of a second magazine B, wherein the intelligent pyrotechnic countermeasure 15 comprises two contacting bodies 41 (rings) via first and second contacting points 35, 35" of the adapter plate 33 for electrical contact with the launching electronic circuitry 19 (see FIG. 8c). According to this embodiment the intelligent pyrotechnic countermeasure 15 can be given signals with commands and information via the two contact bodies 41 of the intelligent pyrotechnic countermeasure 15. The adapter plate 33 comprises two contacting points 35 at the first side 47 for contacting the contacting bodies 41. The second side 49 (hidden in FIG. 8b) of the adapter plate 33 comprises also two second contacting points 35", each connected to respective contacting point 35 of the first side, the two second contacting points 35" of the second side 49 is brought into contact with dedicated contacting members 27 of the set of contacting members 27, 27' of the launching electronic circuit 19 of the system 1, when the second magazine B is mounted in the housing 23.

FIG. 8b illustrates the adapter plate 33 to be mounted in contact with the underside of intelligent pyrotechnic countermeasures 15. FIG. 8c illustrates a cross-section in part of the adapter plate 33 in FIG. 8b showing the second contacting points 35" coming into contact with the dedicated contacting members 27 of the launching electronic circuitry 19. The insulating adapter plate 33 will be in contact with the surrounding contacting members 27' not dedicated for the intelligent pyrotechnic countermeasure 15, wherein these surrounding contacting members 27' will be insulated from each other preventing spark formation between the contacting members 27' not being in use.

Figure 9B:
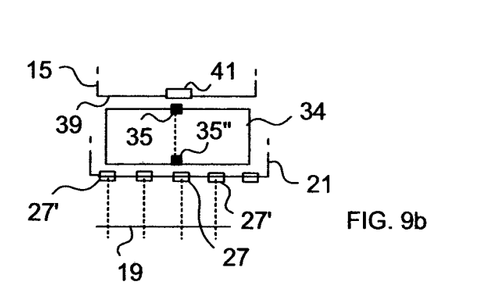

FIG. 9a illustrates a further embodiment including an adapter device designed as a grid block 34 seen from above. The grid block 34 is built of crosswise arranged insulating synthetic ribs joined in such way that they rest on and cover the contacting members 27, 27' of the dispenser 21. The underside 39 of the pyrotechnic intelligent countermeasure 15 rests on the grid block 34. The contacting body 41 is in electrical contact with a first 35 contacting point of the grid block 34. The first contacting point 35 is electrically connected to a second contacting point 35" (see FIG. 9b) of the grid block 34. The second contacting point 35" is in contact with one dedicated contacting member 27 of the set of firing contacts (contacting members) of the dispenser 21. The surrounding contacting members 27' have no contact with the pyrotechnic intelligent countermeasure 15 as being shown in FIG. 9b.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. Other materials than synthetic materials can be used for achieving the insulating feature of the adapter device, such as ceramic aluminium, glass etc.

The invention claimed is:

1. A pyrotechnic countermeasure dispensing system comprising: a dispenser including a housing and a set of contacting members of a launching electronic circuitry; the dispenser can be loaded with either a first magazine or a second magazine, the first magazine designed for accommodation of pyrotechnic countermeasures, the first magazine being mountable in said housing in such way that a contacting body of each pyrotechnic countermeasure is in electrical communication with a dedicated contacting member of the launching electronic circuitry when the system is ready to use; a central electronic unit associated with the launching electronic circuitry for actuating of the pyrotechnic countermeasure accommodated in the first magazine based upon a detected threat; the second magazine designed for accommodation of at least one intelligent pyrotechnic countermeasure, the second magazine being mountable in said housing in such way that when the system is ready to use, a contacting body of said intelligent pyrotechnic countermeasure is in electrical communication with a dedicated contacting member of the launching electronic circuitry via an adapter device, wherein the adapter device comprises an electrically insulated plate including a first side and a second side, the first side comprising a first contacting point for contact with the contacting body of the intelligent pyrotechnic countermeasure, the second side comprising a second contacting point for contact with the dedicated contacting member of the launching electronic circuitry, the first contacting point being in electrical communication with the second contacting point; wherein an electrical signal for launching said intelligent pyrotechnic countermeasure will be sent from the central electronic unit to said dedicated contacting member depending upon a detection of a threat.

2. The countermeasure dispensing system according to claim 1, wherein the number of first contacting points of the adapter device is less than the number of contacting members of the set of contacting members of the launching electronic circuitry.

3. The countermeasure dispensing system according to claim 1 wherein the adapter device is designed to be brought into insulated contact with the contacting point surrounding the dedicated contacting member.

4. The countermeasure dispensing system according to claim 1, wherein the central electronic unit is associated with a plurality of control functionalities for activation and guiding the intelligent pyrotechnic countermeasure, which functionalities are selectable in dependence upon the characteristics of the detected threat.

5. The countermeasure dispensing system according to claim 1, wherein at least one control functionality is designed to be performed over a contacting member of the launching electronic circuitry, the contacting member being in contact with a contacting body of said intelligent pyrotechnic countermeasure via the adapter device.

6. The countermeasure dispensing system according to claim 1, wherein at least one control function is designed to be performed over a dedicated radio control unit associated with the central electronic unit for wireless controlling of the intelligent pyrotechnic countermeasure.

7. The countermeasure dispensing system according to claim 1, wherein each magazine of the system includes an identification code, which is read by the central electronic unit when the magazine is mounted in the housing for identifying the type of magazine.

8. The countermeasure dispensing system according to claim 1, wherein the adapter device is made of synthetic material and is integral.

9. The countermeasure dispensing system according to claim 1, wherein the adapter device also serves as a breech plate.

10. The countermeasure dispensing system according to claim 1, wherein the adapter device is designed to be fit onto the second magazine utilizing a snap-lock device.

11. An intelligent pyrotechnic countermeasure magazine for accommodation of intelligent pyrotechnic countermeasures, wherein the magazine is mountable in a housing of a dispenser of a dispensing system, when the system is ready to use the intelligent pyrotechnic countermeasure is in electrical communication with a dedicated contacting member of the dispenser via an adapter device, wherein said adapter device comprises an electrically insulated plate, a first side of the insulated plate comprises a first contacting point for contact with a contacting body of the intelligent pyrotechnic countermeasure, and a second side of the insulated plate comprises a second contacting point for contact with said dedicated contacting member, and the first contacting point being in electrical communication with the second contacting point, wherein said adapter device is designed to be brought into insulated contact with contacting point surrounding the dedicated contacting member and wherein the number of first contacting points of said adapter device is less than the number of contacting members of the dispenser.

* * * * *